US012239976B2

(12) United States Patent
Williams et al.

(10) Patent No.: US 12,239,976 B2
(45) Date of Patent: Mar. 4, 2025

(54) VIAL AUTOLOADER

(71) Applicant: AMETEK, INC., Berwyn, PA (US)

(72) Inventors: Archibald Williams, Wareham, MA (US); Glen Johnson, Mesa, AZ (US); Isauro Amaro, Tempe, AZ (US); Jiangjiang Dai, Perrysburg, OH (US); Kai Johnstad, Cumberland, RI (US); James A. Salomon, Providence, RI (US); Christian Vézina, Levis (CA); Rémi Deroche, Quebec (CA)

(73) Assignee: AMETEK, INC., Berwyn, PA (US)

( * ) Notice: Subject to any disclaimer, the term of this patent is extended or adjusted under 35 U.S.C. 154(b) by 808 days.

(21) Appl. No.: 17/470,902

(22) Filed: Sep. 9, 2021

(65) Prior Publication Data

US 2022/0105507 A1     Apr. 7, 2022

Related U.S. Application Data

(60) Provisional application No. 63/086,938, filed on Oct. 2, 2020.

(51) Int. Cl.
  *B01L 3/00* (2006.01)
  *G01N 35/00* (2006.01)
  *G01N 35/10* (2006.01)

(52) U.S. Cl.
  CPC ......... *B01L 3/5025* (2013.01); *B01L 3/50825* (2013.01); *G01N 35/00584* (2013.01); *G01N 35/10* (2013.01); *B01L 2200/025* (2013.01); *B01L 2200/18* (2013.01); *B01L 2300/042* (2013.01); *B01L 2300/0609* (2013.01); *B01L 2300/0663* (2013.01); *B01L 2300/0803* (2013.01); *B01L 2400/0475* (2013.01)

(58) Field of Classification Search
  None
  See application file for complete search history.

(56) References Cited

U.S. PATENT DOCUMENTS

| 4,609,017 A | * | 9/1986 | Coulter | G01N 35/0095 |
| | | | | 422/561 |
| 4,797,258 A | * | 1/1989 | Mochida | G01N 35/021 |
| | | | | 422/65 |
| 2010/0291619 A1 | | 11/2010 | Robinson et al. | |

OTHER PUBLICATIONS

Anonymous, "Arizona Instrument Computrac Vapor Pro(TM) Moisture Analyzer User Manual", Jul. 31, 2003 (Jul. 31, 2003), pp. 1-46, XP055881340, Retrieved from the Internet: URL:https://www.artisantg.com/info/Arizona_Instrument_3100_L_Manual_2019129141719.pdf [retrieved on Jan. 19, 2022] Figure on p. 2; pp. 1-8.

International Search Report and Written Opinion for International Application No. PCT/US2021/052795, dated Jan. 28, 2022 (Jan. 28, 2022)—13 pages.

* cited by examiner

*Primary Examiner* — P. Kathryn Wright
(74) *Attorney, Agent, or Firm* — CM Law; Stephen J. Weed

(57) ABSTRACT

An autoloader is disclosed for staging samples in vials to be loaded automatically into an analyzer such as a moisture analyzer for moisture analysis. The analyzer uses vials to hold small amounts of sample materials. The autoloader holds the vials in a horizontal orientation for delivery to and removal from the analyzer.

9 Claims, 14 Drawing Sheets

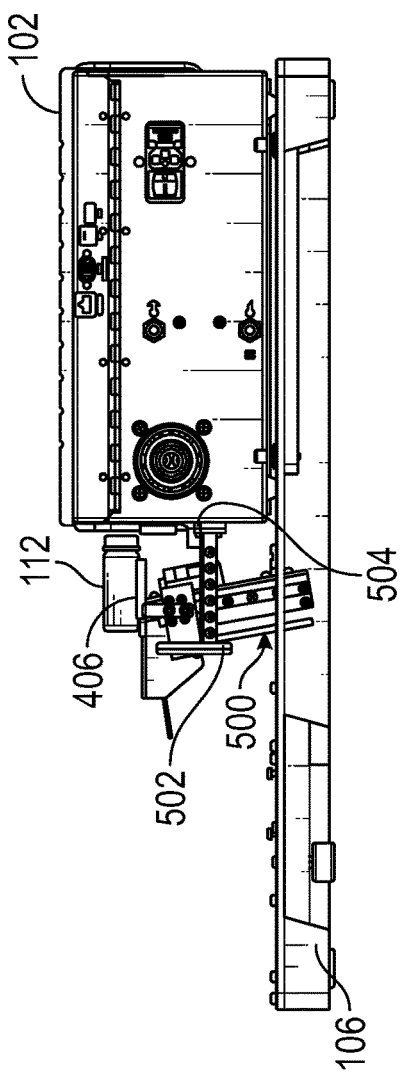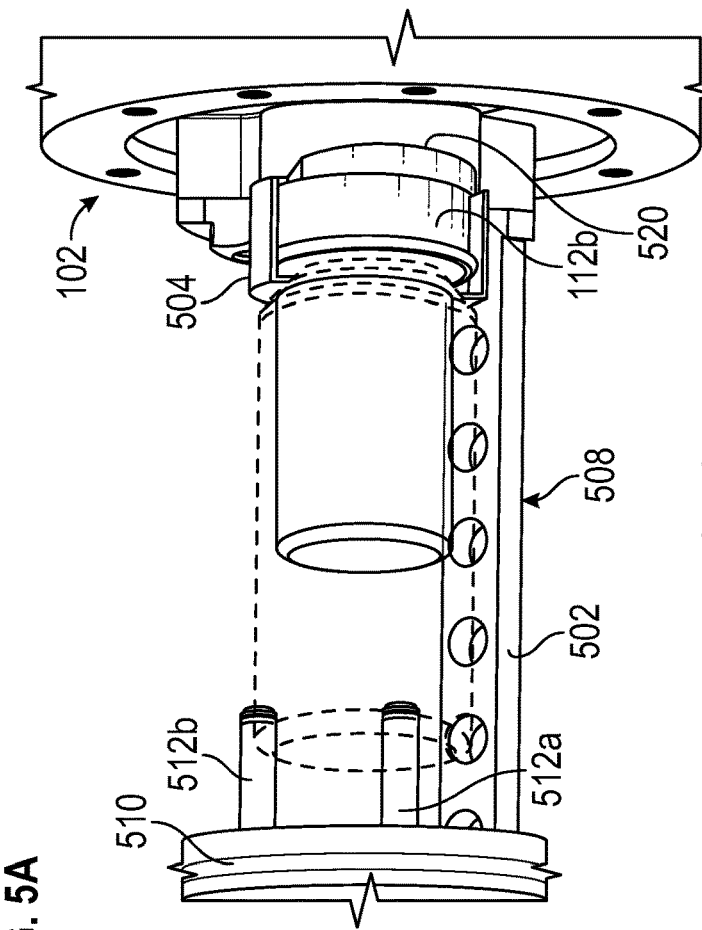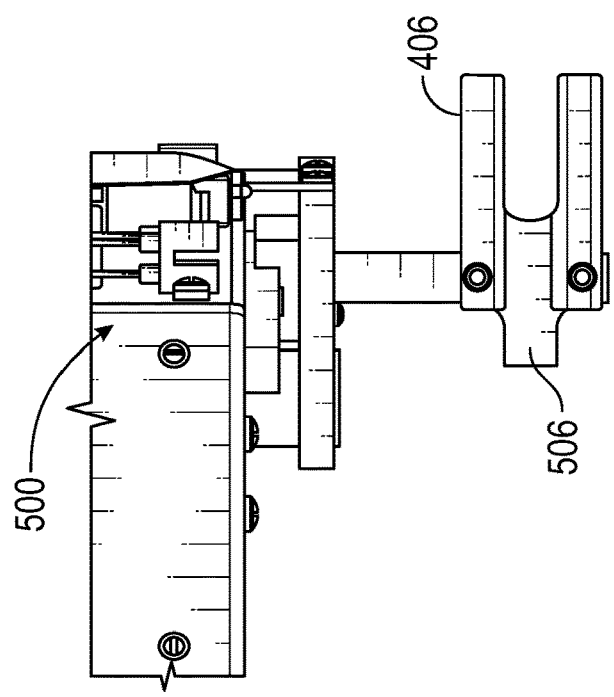
FIG. 5A
FIG. 5B
FIG. 5C

VIAL AUTOLOADER

FIELD OF THE INVENTION

Examples of the present invention relate generally to autoloaders and, more specifically, to an autoloader for vials to be used with an analyzer such as a moisture analyzer.

BACKGROUND OF THE INVENTION

Analyzers such as moisture analyzers are used to analyze the contents of samples. Often, the samples are placed in respective vials and inserted into an analyzer for analysis. In some implementations, the vials are manually loaded into the analyzer for analysis one vial at a time. If there are a lot of vials it is labor intensive to load a vial, monitor the analyzer for completion, remove the vial, and load/remove each subsequent vial.

SUMMARY OF THE INVENTION

Autoloaders for loading vials into an analyzer. In one example, the analyzer has a carriage assembly configured to load and unload each of the vials into the analyzer in a horizontal orientation. In accordance with this example, the autoloader includes a lifter, a deck, a vial carousel above the deck, and a controller coupled to the lifter and the vial carousel. The lifter has a vial carrier support, the lifter configured to move the vial carrier support between a raised position and a lowered position, wherein, when the device is connected to the analyzer, the raised position is above the carriage assembly and the lowered position is below the carriage assembly. The deck has a lower surface and an upper surface and includes an opening extending from the lower surface to the upper surface, the opening positioned and sized to accommodate the vial carrier support of the lifter when moving between the lowered position and the raised position. The vial carousel has vial transport stations, where each vial transport station is configured to receive a vial in a horizontal orientation and is arranged to transport the received vial to a loading location for the vial carrier support as the vial carousel rotates.

In one implementation, the vial carrier support is initially positioned in the raised position (and serves as a base for vials in vial transport stations passing over the opening). In accordance with this implementation, the controller rotates the vial carousel to align a transport station with the loading location for the vial carrier support and lowers the vial carrier support from the raised position to the lowered position, wherein, when the device is connected to the analyzer, the carriage assembly engages the first vial and disengages the first vial from the vial carrier support for loading into the analyzer. In accordance with this implementation, as the carousel rotates, the vials may roll within their respective vial transport stations on the surface of the deck (and over the vial carrier support in the raised position).

In another implementation, the controller rotates the vial carousel to align a transport station (configured as a cradle that supports the vial) with the loading location for the vial carrier support, raises the vial carrier support to the raised position to engage a first vial in the first transport station, rotates the vial carousel to move the transport station out of the way, and lowers the vial carrier support from the raised position to the lowered position, wherein, when the device is connected to the analyzer, the carriage assembly engages the first vial and disengages the first vial from the vial carrier support for loading into the analyzer. In accordance with this implementation, as the carousel rotates, the vials may be fully supported by the cradle such that they do not engage the surface of the deck or roll.

BRIEF DESCRIPTION OF THE DRAWINGS

For the purpose of illustration, there are shown in the drawings various examples of the present invention. It should be understood, however, that the invention is not limited to the precise arrangements, dimensions, and instruments shown. Like numerals indicate like elements throughout the drawings. A letter designation may be added to reference numbers for multiple elements of the same or similar type. When referring to the elements collectively or a non-specific one of the elements the letter designation may be omitted. In the drawings:

FIG. 5A is a side view of the autoloader vial lifter and its relation to the analyzer in the analyzer with vial autoloader system of FIG. 1;

FIG. 5B is a top view of the vial lifter of the autoloader vial lifter of FIG. 5A;

FIG. 5C is a top view of the analyzer carriage for receiving a vial in the analyzer of FIG. 5A;

DETAILED DESCRIPTION OF THE INVENTION

Autoloaders are devices that can automatically load multiple vials sequentially into an analyzer for analysis without human intervention after an initial loading process. A technician may initially place the vials into the autoloader and then the autoloader sequentially loads vials into the analyzer and removes the vials from the analyzer. Thus, after the initial placement, the technician is free to perform other activities.

Figure 1:
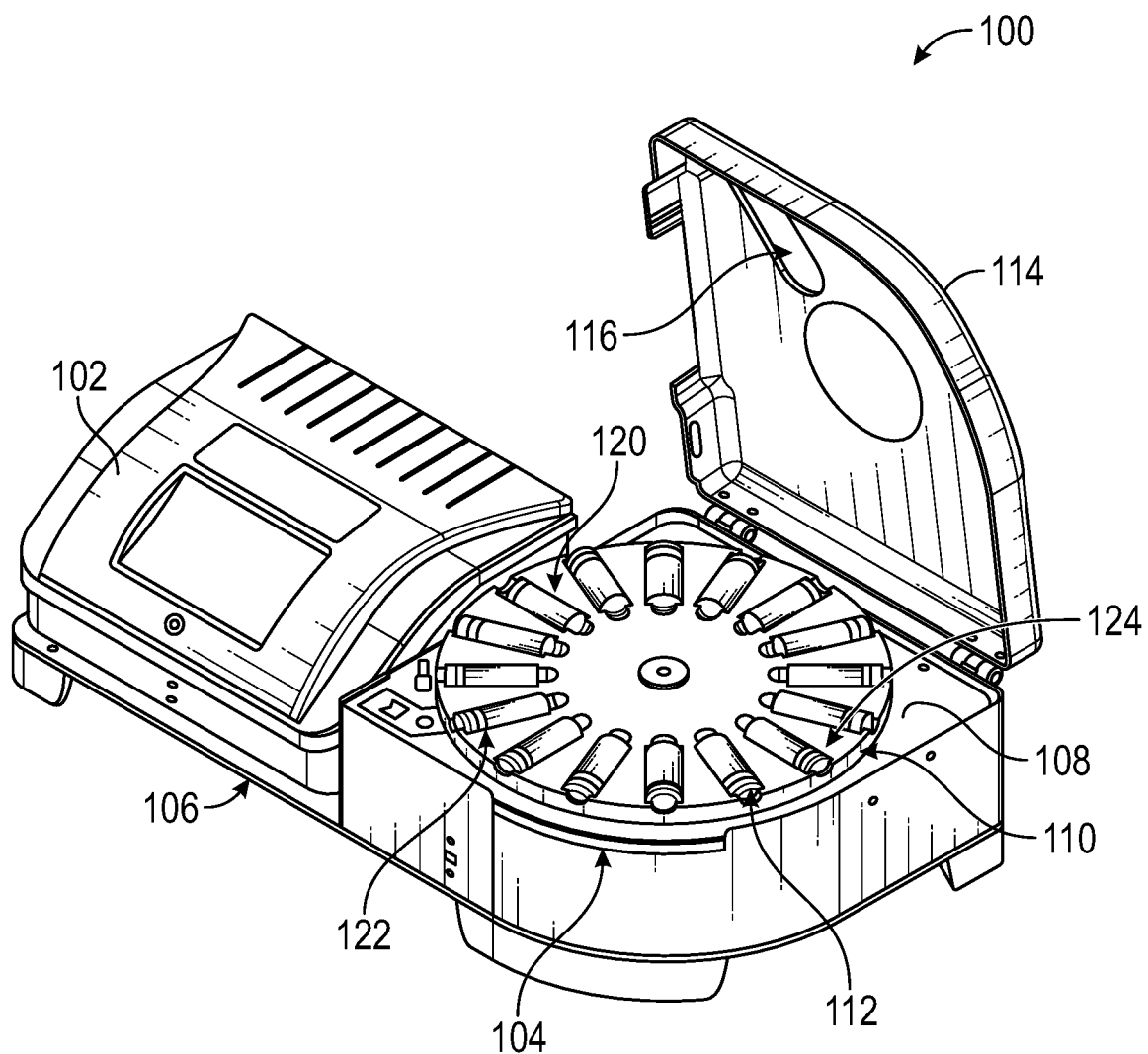
FIG. 1 is a perspective view of an analyzer with vial autoloader system.

FIG. 1 depicts an analyzer with vial autoloader system 100. The system 100 includes an analyzer 102 and an autoloader 104 positioned on a base 106. A suitable analyzer is a Vapor Pro XL moisture analyzer available from Brookfield of Middleboro, Massachusetts Although a moisture analyzer is depicted and described herein, other types of analyzers for analyzing samples within vials may be used with the autoloaders described herein.

The autoloader 104 is adjacent the analyzer 102 and is configured to manipulate sample vials 112 to allow automatic batch processing. A vial handling mechanism within the autoloader 104 (e.g., carousel 110) allows retention of several sample vials 112 and sequential tests to be run without operator involvement. Typical tests take 5-30 minutes and the duration of tests is not always fixed (e.g., may be dependent on the sample, quantity, and end conditions), so the ability of the system 100 to run batches of tests unattended is very attractive.

In an example, the autoloader 104 sequentially delivers vials 112 via the carousel 110 and a lifter 500 (FIGS. 5A and 5B) to a carriage assembly of the analyzer 102 (e.g., carriage assembly 502; FIGS. 5A and 5C). The illustrated carriage assembly 502 of the analyzer 102 includes a vial retainer 504 that holds each vial 112 securely by the cap 112*b* (and optional support protrusion 512 that provide additional support to a lower surface of the vial). Upon loading the vial 112 into the carriage assembly, the carriage assembly is moved (along with the loaded vial 112) into an interior portion of the analyzer 102. This motion causes a fixed needle within the interior portion of the analyzer 102 to puncture a septum with the cap 112*b* of the vial 112, allowing air exchange to measure the overall moisture in the vial 112. The interior portion additionally includes a heater (not shown), which heats the vial and sample to release water that is absorbed by the sample. Once the test cycle is finished, the carriage assembly moves the hot vial out of the analyzer 102, extracting the needle and returning the vial 112 to a position outside the analyzer 102 for removal by the autoloader 104 and return to the carousel. Finished samples are disposed of, with the possibility of recycling the sample vial, cap, and septum.

Figure 3A:
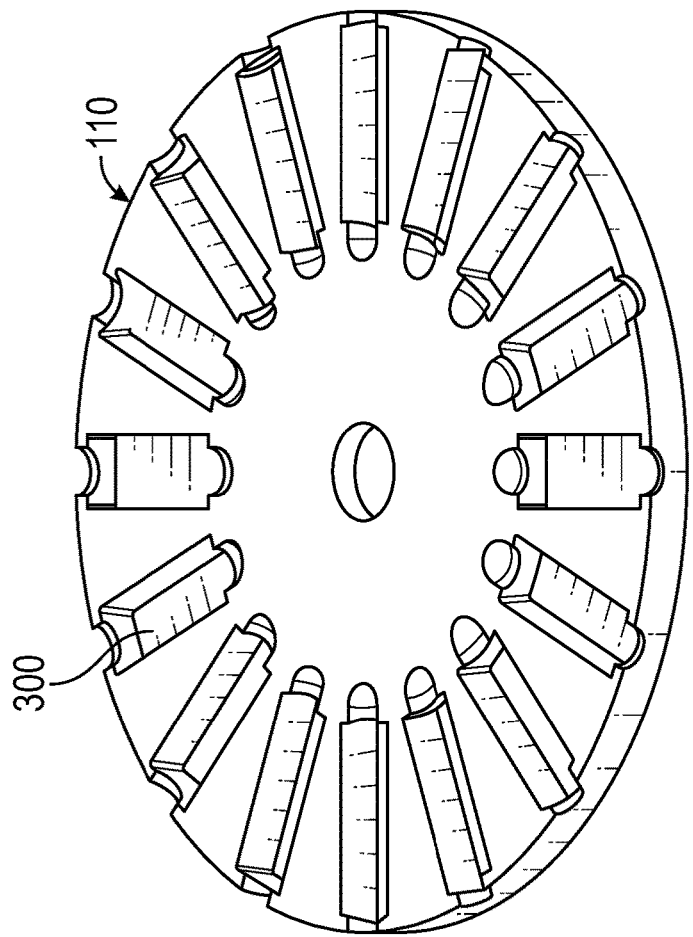
FIG. 3A is a perspective view of a carousel for use in an autoloader of the analyzer with vial autoloader system of FIG. 1.

The autoloader 104 holds a plurality of vials 112 in vial transport stations (16 vial transport stations in the illustrated embodiment). In the autoloader 104 depicted in FIG. 1, each vial transport station include a respective radial slot in a carousel 110 (e.g., slot 300; FIG. 3A). The carousel 110 is supported above an inner deck 108 of the autoloader 104. In one example, the inner deck 108 provides support from below to the vials positioned within the slots when the slots are not above a processing station where the vial may be removed from the autoloader (e.g., at loading station 120 or disposal station 124). In accordance with this example, the inner deck 108 forms part of the vial transport station where the inner deck 108 is present to engage a lower surface of a vial.

The vials 112 are loaded into respective slots of the carousel 110 through an opening 116 in a cover 114 (when the cover is closed). The cover 114 limits access to a batch of vials 112 while the analyzer 102/autoloader 104 are running to eliminate the possibility that vials would be removed or relocated in the carousel 110. If the cover 114 is opened, the electronics 402 (see FIG. 4A) check that vials are loaded in "active" positions and oriented correctly when subsequently closed.

The autoloader 104 includes one or more processing stations. In an example, the autoloader 104 includes a loading station 120, a vial detection station 122, and a vial disposal station 124. The loading station 120 is a station for use in automatically loading vials 112 into the analyzer 102 for analysis and receiving analyzed vials 112 after analysis. The loading station 120 is positioned above a vial lifter 500 (FIG. 5A-C) adjacent the analyzer 102. The inner deck 108 includes an opening through which the vial lifter 500 raises and lower a vial carrier support 406 (FIGS. 5A and 5B).

The vial detection station 122 is a station that detects whether a vial is present at a particular location in the carousel 110. In the illustrated embodiment, the vial detection station 122 is positioned below the opening 116 when the cover 114 is closed such that vials can be detected and registered to a particular location in the carousel 110 when a user places a vial through the opening 116 into the carousel. The vial disposal station 124 is a station that disposes of vials. The vial disposal station 124 is positioned in an area to facilitate disposal, e.g., on an opposite side of the carousel 110 from the loading station 120.

Figure 2A:
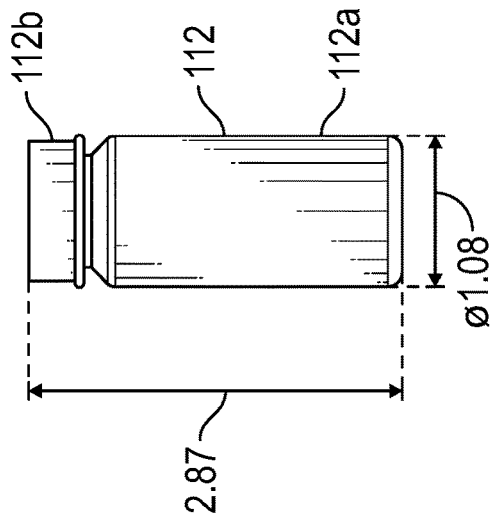
FIGS. 2A and 2B are side views of a prior art vial in a vertical orientation (FIG. 2A) and a horizontal orientation (FIG. 2B) for use in the analyzer with vial autoloader system of FIG. 1.
Figure 2B:
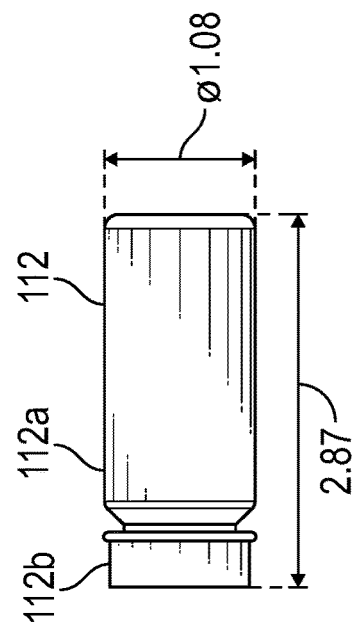

FIG. 2A depicts one example of a vial 112 in a vertical orientation than may be used with the autoloader 104 and analyzer 106. The vial 112 includes a vial body 112*a* and a vial cap 112*b*. The illustrated vial 112 has a height of 2.87 inches and a diameter of 1.08 inches. FIG. 2B depicts the vial 112 in a horizontal orientation in which a side of the vial 112 faces a lower surface. Other vials having other dimensions may also be used with the system. In an example, the vial 112 is maintained in the horizontal orientation at all times to distribute the sample for heating and exposure to air flow.

Figure 3B:
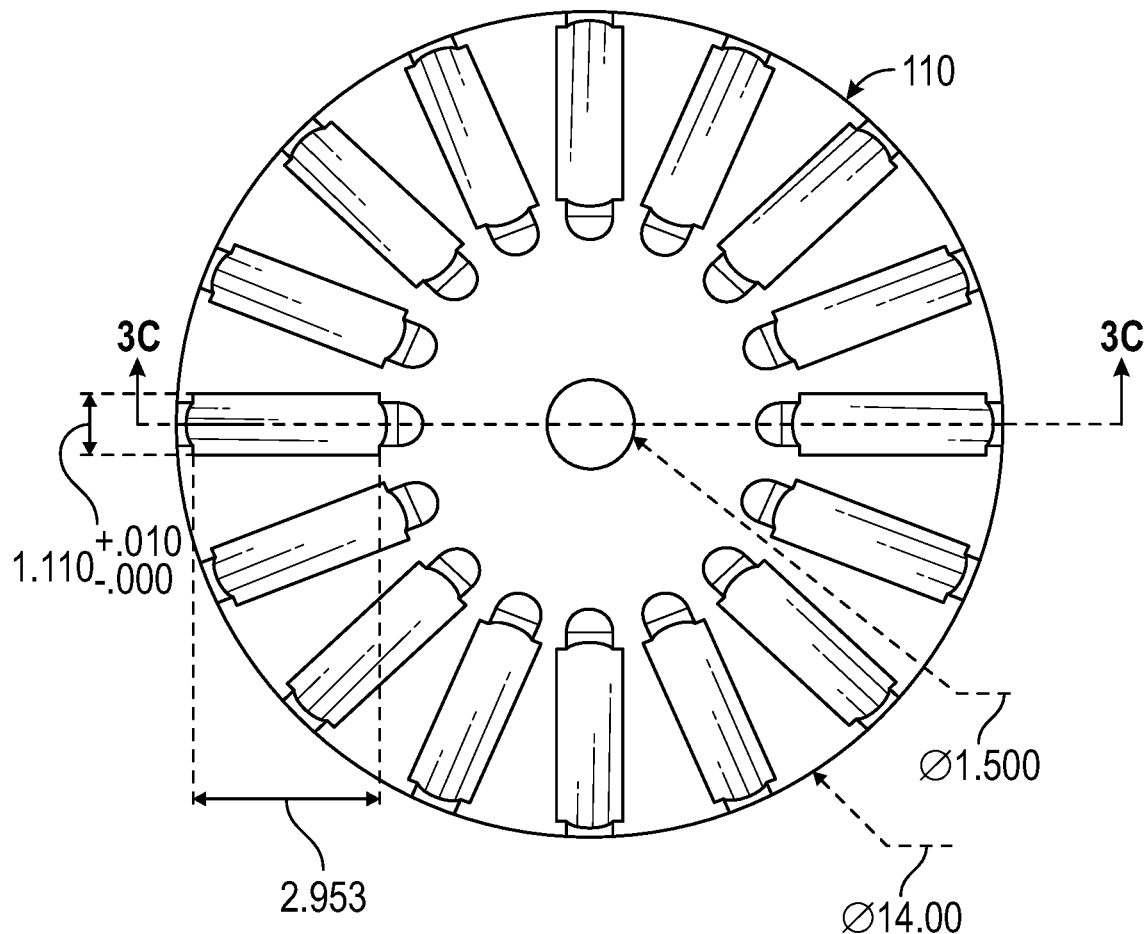
FIG. 3B is a top view of the carousel of FIG. 3A.
Figure 3C:
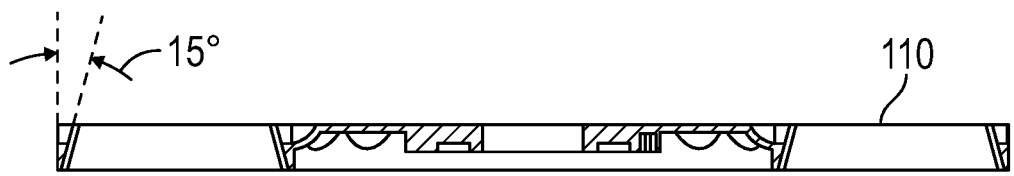
FIG. 3C is a cutaway view of the carousel of FIG. 3B as viewed along A-A.

FIGS. 3A-3C depict the carousel 110 removed from the autoloader 104. The carousel 110 includes slots 300 for receiving the vials 112. In the illustrated embodiment, each slot 300 is a rectangular opening that extends completely though the carousel 110 and is longer (e.g., 2.953 inches) than the height of the vial 112 and wider (e.g., 1.110-1.120 inches) than the width of the vial 112 such that the carousel 110 does not support the lower side of the vial 112 when positioned horizontally within the slot 300. Rather, the vial is supported by the surface that is below the carousel 110 when the carousel 110 is positioned within the autoloader 104 (i.e., the inner deck 108 or other surfaces in the same plane as the inner deck such as the vial carrier support 406 (FIG. 4) in the loading station 120 and a trap door in the vial disposal station 124). Each slot 300 has a depth that is sized to produce rolling movement of the vial 112 and to horizontally constrain the vial 112 within the slot 300 as the carousel 110 rotates (e.g., a thickness of 0.67 inches for a 1.08 inch diameter vial). Nominally, the vials 112 are free to rotate, rolling on the deck 108 (and over the vial carrier support 406 and the trap door) as the carousel 110 rotates—each slot urging its respective vial 112 in a radially horizontal direction. In an example, each slot 300 includes at least one side that is angled inward (e.g., by approximately 15 degrees) from bottom to top of the carousel 110 to reregister the vial 112 within the slot 300 as the vial is returned to the carousel 110 after analysis.

Figure 4A:
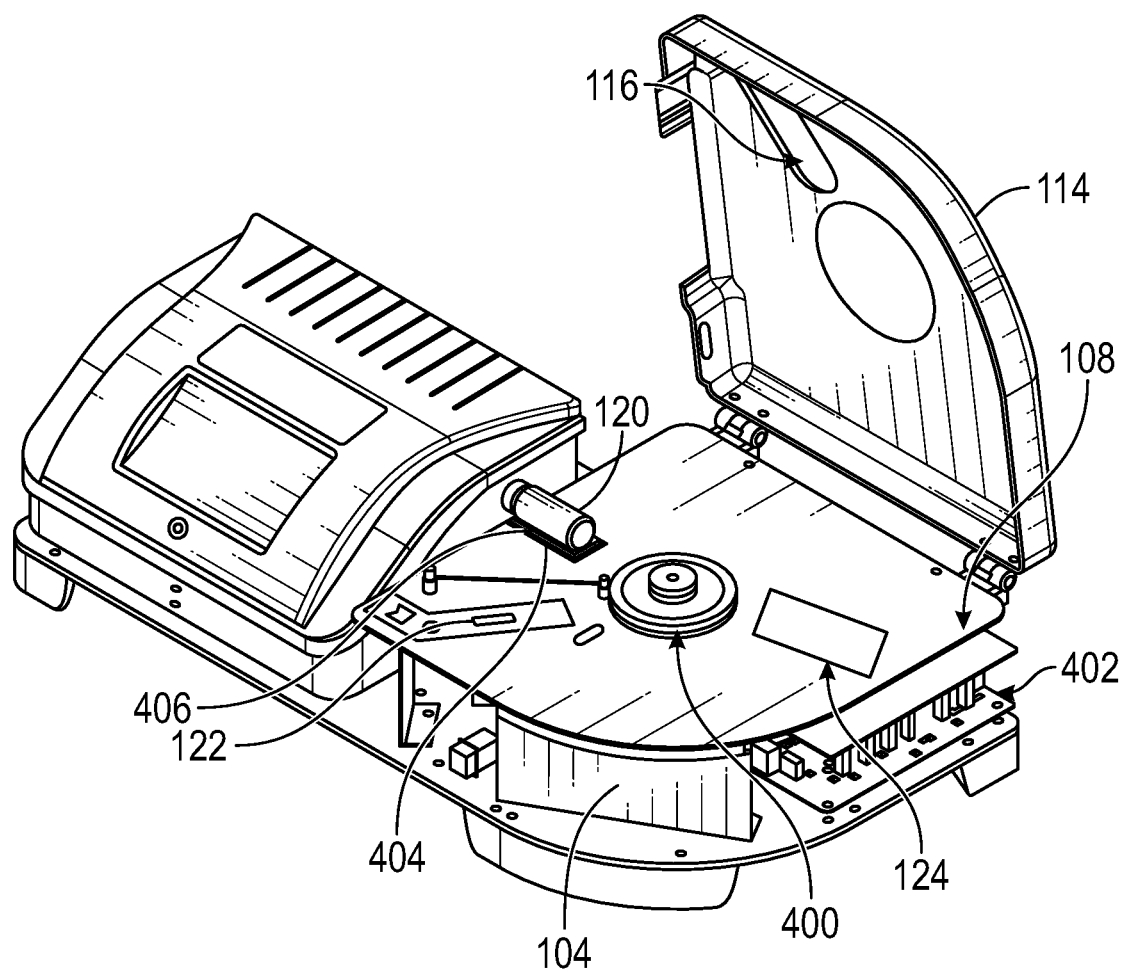
FIG. 4A is a perspective view of the analyzer with vial autoloader system of FIG. 1 with the autoloader cover open and carousel removed.

FIG. 4A depicts the autoloader 104 with the carousel 110 removed. The inner deck 108 include an opening for a drive hub 400, which supports the carousel 110 above the inner deck with a small amount of clearance (e.g., approximately 0.1 inches) and rotates the carousel 110 to reposition the vials 112 on the surface of the inner deck 108. Electronics 402 within the autoloader 104 communicate with electronics (not shown) within the analyzer 102 to control the drive hub and, thereby, the carousel 110 to selectively position the vials 112 for loading into the analyzer 102 and for disposal.

Figure 6B:
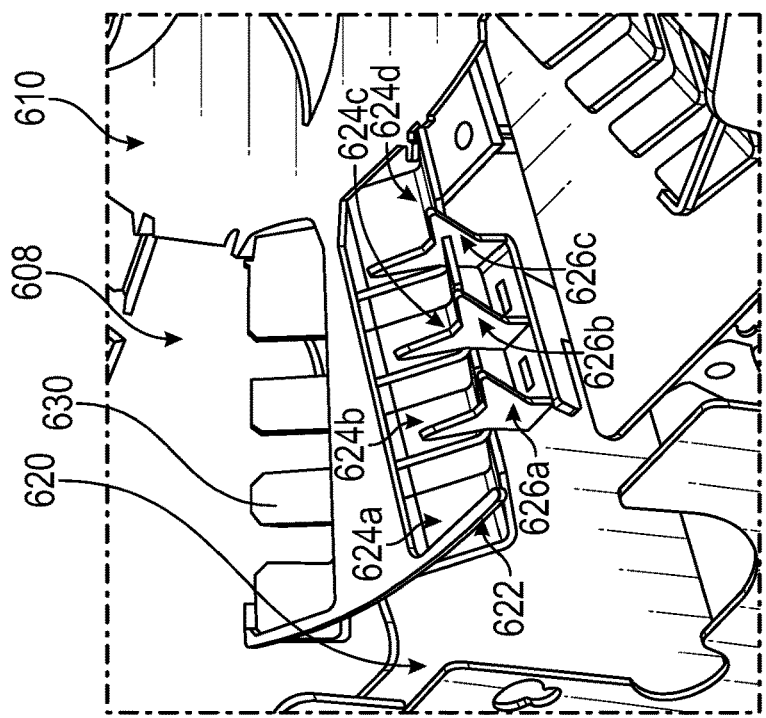
FIGS. 6A and 6B are perspective views of an alternative carousel for an autoloader.

The inner deck 108 also includes an opening 404 that, in the illustrated embodiment, is sized and positioned to sequentially correspond with individual slots 300 of the carousel 110 as the carousel 110 is rotated by the hub 400. A vial carrier support 406 in accordance with the illustrated embodiment is sized and positioned to fit within the opening 404 and support a vial 112 when a respective slot 300 passes over the opening 404 with the vial carrier support 406 in an upper position. In other embodiments, e.g., where the carousel includes cradles that fully supports the vials (e.g., cradle 622; FIG. 6B), the opening in the inner deck 108 may be expanded or the inner deck may be eliminated.

The deck 108 additionally includes an opening for disposing of the vial in the disposal station 124. In one example, the vial detecting station 122 also includes an opening for receiving a sensor for sensing a vial 112. In another example, the sensor is positioned below the deck 108 without the need for an opening.

Figure 4C:
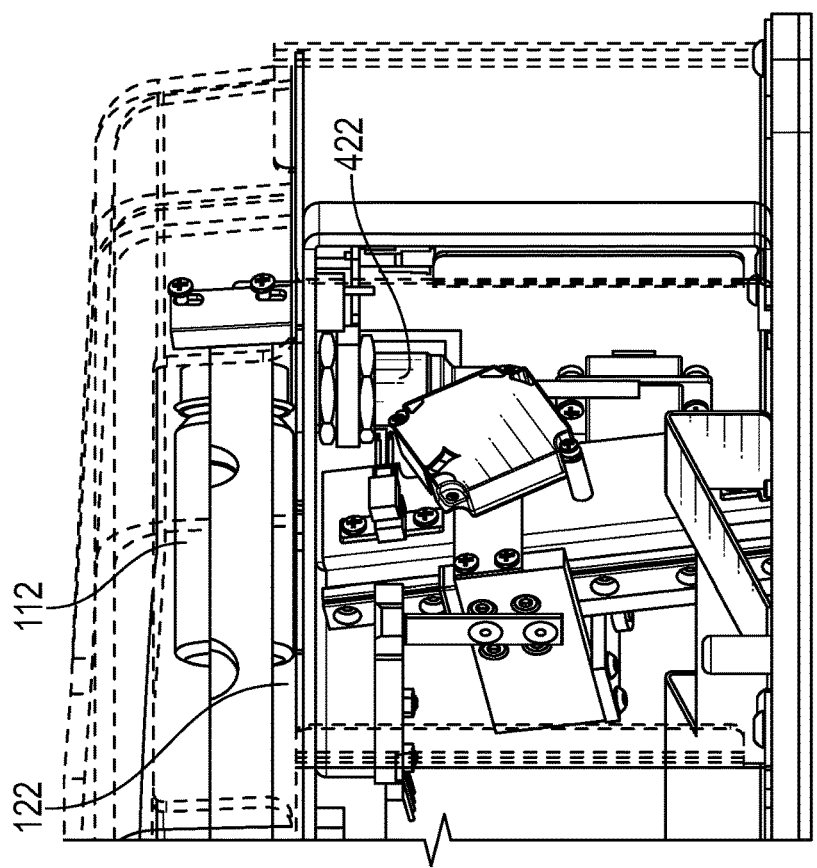
FIGS. 4B and 4C are top and side views, respectively, of a vial detection station.
Figure 4B:
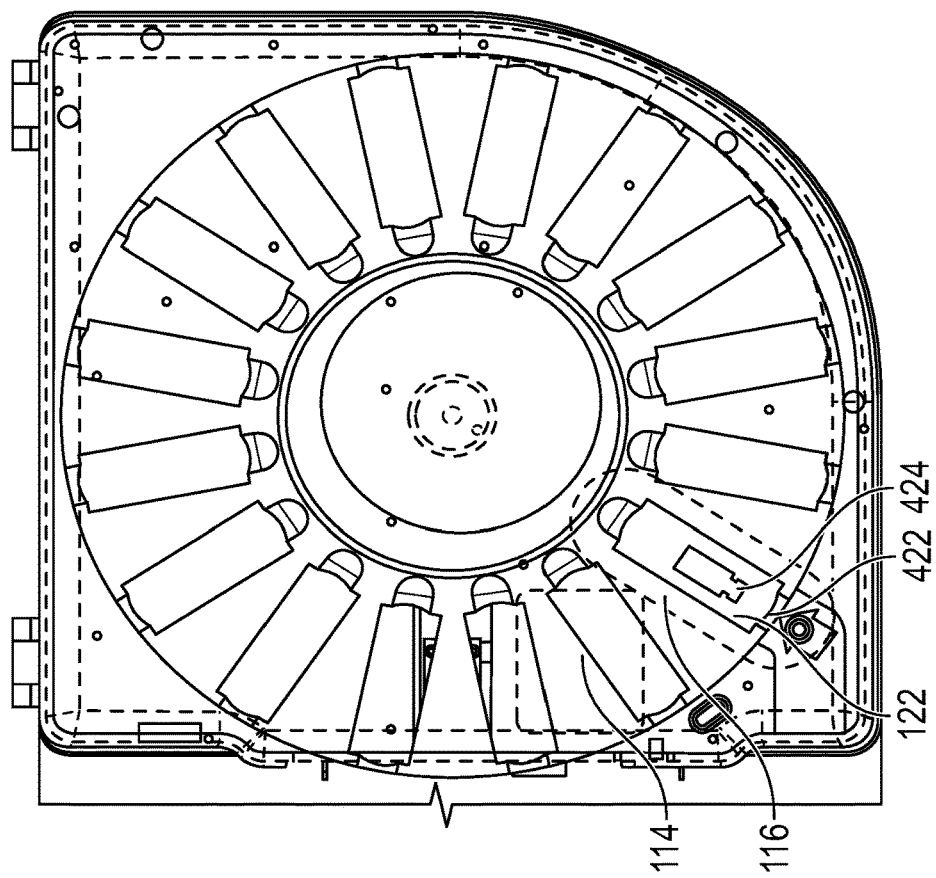

FIGS. 4B and 4C depict a top view and a side view of the autoloader 104 with the cover 114 in a closed position that is useful for describing vial detection. In an example, a user manually inserts a vial 112 though an opening 116 in the cover 114 into a slot 300 within the carousel 110. A sensor 422 positioned in the vial detection station 122, which is below the opening 116, senses the presence of the inserted vial 122, which is communicated to the electronics 402 of the autoloader 104 for storage and tracking that vial in that particular slot within the carousel. A loading position label 424 is positioned on the inner deck 108 to provide the user with information regarding the proper positioning of the vial 112 within the carousel 110.

In one example, the sensor 422 is an inductive sensor (e.g., a Hall effect sensor) configured to sense a change in the electromagnetic field surrounding the sensor due to a metallic cap 112*b* of the vial 112 being adjacent the sensor 422. Since the inductive sensor detects the presence of metal, the vial must be loaded with the cap 112*b* in the correct orientation to register. If it is loaded backwards, the carousel slot will be considered empty, and the lifter 500 will not try to lower it into the carriage assembly 502 of the analyzer 102.

In use, the vial detection station 122 is used to perform one or more of the following: (1.) verify presence and proper orientation when a vial is loaded into the carousel, e.g., after the user is prompted by the software of the autoloader via a display screen (not shown), (2) verify presence and proper return orientation after the vial has been analyzed and returned to the carousel, and (3.) check the presence or absence of vials in each slot in the carousel when the main access cover 116 has been opened and then closed. To check the presence or absence of vials in each slot after the cover 114 has been opened and closed, the electronics 402 perform a complete rotation of the carousel with each slot 300 passing over the vial detection station.

Figure 4E:
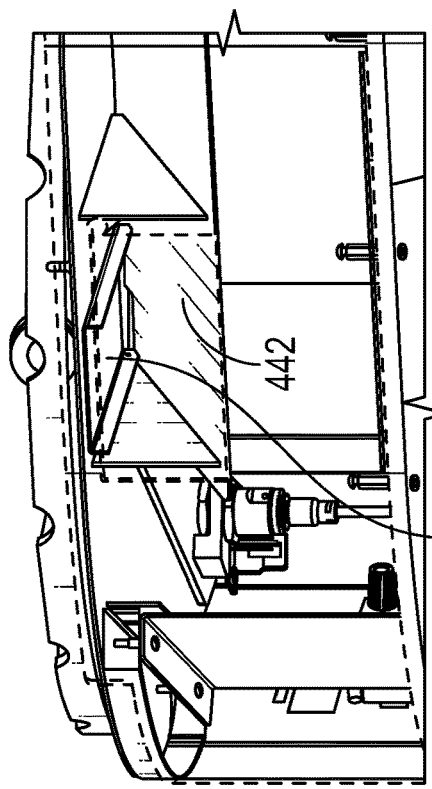
FIGS. 4E and 4F are respective side perspective views of the vial disposal station of FIG. 4D with a trap door closed and a trap door open.
Figure 4F:
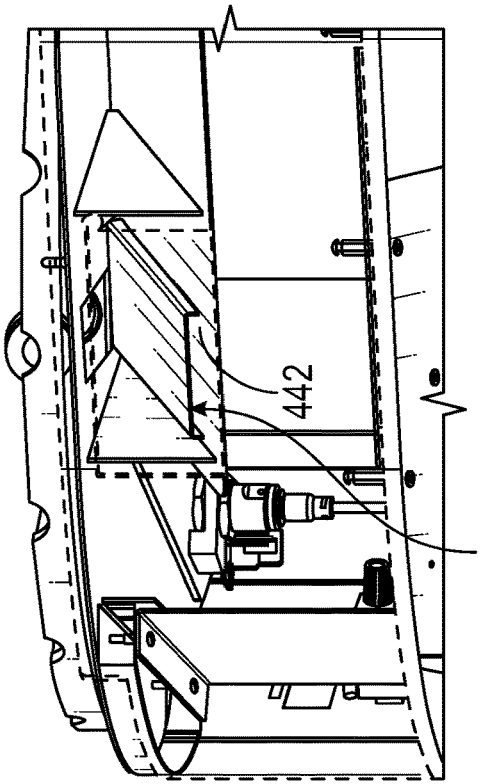
Figure 4D:
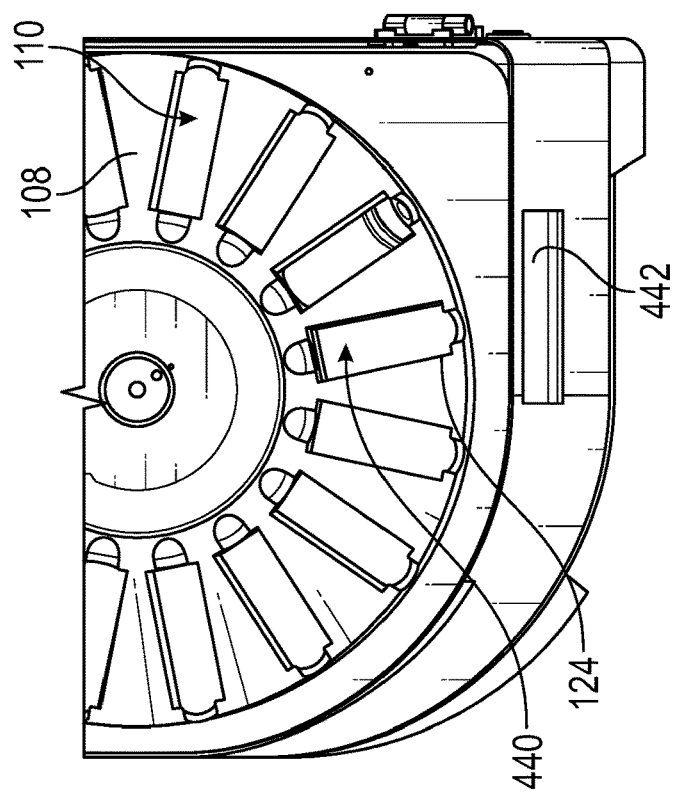
FIG. 4D is a top perspective view of a vial disposal station.

FIG. 4D depicts a top perspective view and FIGS. 4E and 4F depict side perspective views of the autoloader 104 with the cover removed that is useful for describing vial disposal. In an example, the electronics 402 rotate a vial 112 within the carousel 110 for disposal to a vial disposal station 124. The vial disposal station 124 includes a trap door 440 rather than the deck 108 below the opening 300 in the carousel 110.

FIG. 4E depicts the trap door 440 in the closed position and FIG. 4F depicts the trap door 440 in the open position. When the trap door 440 is closed, the top surface of the trap door 440 acts as an extension of the deck 108 and the vial 112 is maintained within the carousel. When the trap door 440 is open, the trap door 440 moves out of the way, creating an opening 442 through which the vial 112 falls. A collection bin (not shown) may be positioned adjacent the opening 442 to catch the vials 112 for disposal.

In one example, a vial 112 is removed from the carousel in response to operation input via a user interface (UI; not shown) with each vial unloaded automatically after processing. This allows the system to run continuously with new vials loaded into the vacated space without the operator having to review the data to see which vials remaining in the carousel have already been processed.

FIGS. 5A-5C depict a vial lifter 500 that raises and lowers the vial carrier support 406. A sample vial 112 is moved into a carriage assembly 502 of the analyzer 102 by the vial lifter 500, which is driven by a linear actuator. The vial lifter 500 is positioned and configured such that the carriage assembly 502 can slide into the analyzer 102 ("vial sample analysis position") and out of the analyzer 102 ("vial loading position") in a horizontal direction 514 both when the vial carrier support 406 is in a raised position above the carriage assembly 502 and when the vial carrier support 406 is in a lowered position below the carriage assembly 502.

The opening 404 in the deck 108 enables the vial 112 to roll onto the vial carrier support 406 when the respective slot 300 aligns with the opening 404. A specified vial can be delivered to the vial carrier support 406 by rotating the carousel 110 such that the respective slot 300 in the carousel 110 aligns with the deck opening 404. When the carousel 110 is rotated, the vial carrier support 406 is in a raised position, to support the vials 112 as their respective slots 300 pass over the opening 404 in the deck 108. The carousel 110 can rotate continuously, and vials will simply roll over the vial carrier support 406. Once the desired vial has been aligned with the opening 404, the vial carrier support 406 is lowered by the vial lifter 500 to position the vial 112 in the carriage assembly 502 of the analyzer 102.

The carriage assembly 502 includes a vial retainer 504, a beam 508, and a door 510. The beam 508 supports the door 510 on one side of the carriage assembly 502 to enable the lifter 500 to raise/lower the vial carrier support 406 though an interior of the carriage assembly 502 while the carriage assembly is in the carriage loading position. The door 510 has a pair of protrusion 512*a* and 512*b*. The vial retainer 504 supports one end of the vial 112 (e.g., by gripping the cap 112*b*) and the pair of protrusions 512*a* and 512*b* support the other end of the vial 112. The illustrated vial carrier support 406 includes an extension 506 to provide addition vial support area. The extension 506 is sized and positioned to pass between the pair of protrusions 512*a* and 512*b* as the vial carrier support 406 to raised and lowered.

In operation, to load a vial, the analyzer 102 slides the carriage assembly 502 out of an interior portion of the analyzer 102 into a carriage loading position while the vial carrier support 406 is raised and supporting a vial 112. As the vial carrier support 406 is lowered from the raised position and passes through a central portion of carriage assembly 502, while in the carriage loading position, the vial 112 is lifted off the vial carrier support 406 and supported by the vial retainer 504 and the protrusions 512a and 512b. With the vial carrier support 406 below the carriage assembly 502, the analyzer 102 slides the carriage assembly 502 into the interior portion of the analyzer 102 for processing and analysis. After the sample within the vial 112 is analyzed, the process is reversed with the carriage assembly sliding out and the vial carrier support 406 rising though the central portion of the carriage assembly 502 to lift the vial off of the protrusions 512a and 512b and return the vial to the entrance of the opening 404 and its position within the carousel 112. The carousel then rotates to bring a subsequent vial into position for loading.

In the illustrated example, the lifter 500 moves the carrier support at an angle with respect to the analyzer 102 such that the vial 112 (in particular, the cap 112b) moves toward the vial retainer 504 of the carriage assembly 502 as it is lowered. A chamfer surface 520 assists with guiding the vial 112 into the vial retainer 504 to axially register the vial in the correct position within the carriage assembly 502. The chamfer surface 520 may have an angle of between 5 and 20 degrees from vertical. The angled chamfer surface 520 in combination with the lifter angle assist with engaging the vial to the retainer 504. Use of a passive surface enable the elimination of an active "pusher" to register the vials. Additional control axis can improve latitude of the carousel system so that a wider range of vial lengths can be accommodated with the same carousel.

After a vial 112 is delivered to the carriage assembly 502 of the analyzer 102 and constrained in the retainer 504, the vial is pushed onto a needle as it is drawn into the analyzer 102 and withdrawn from the needle as it is pushed out of the analyzer 102. Surfaces on the retainer 504 engage the cap 112b of the vial 112 at the top of the cap, and the bottom edge of the cap, so that the cap 112b is constrained during both opening and closing motions of the carriage assembly 502.

The carousel 110 is driven by a motor with an encoder to keep track of position. An optical sensor may be used to detect notches in the carousel 110 in order to find the absolute position of the carousel at power up.

The carousel 110 is removable by the operator, e.g., to enable changing to another carousel that accommodates a different vial size, and to access the analyzer 102 and autoloader 104 for calibration or other maintenance. The slots 300 are sized to allow for the tolerances in vial sizes, but clearance is limited to control the vial position.

Figure 6A:
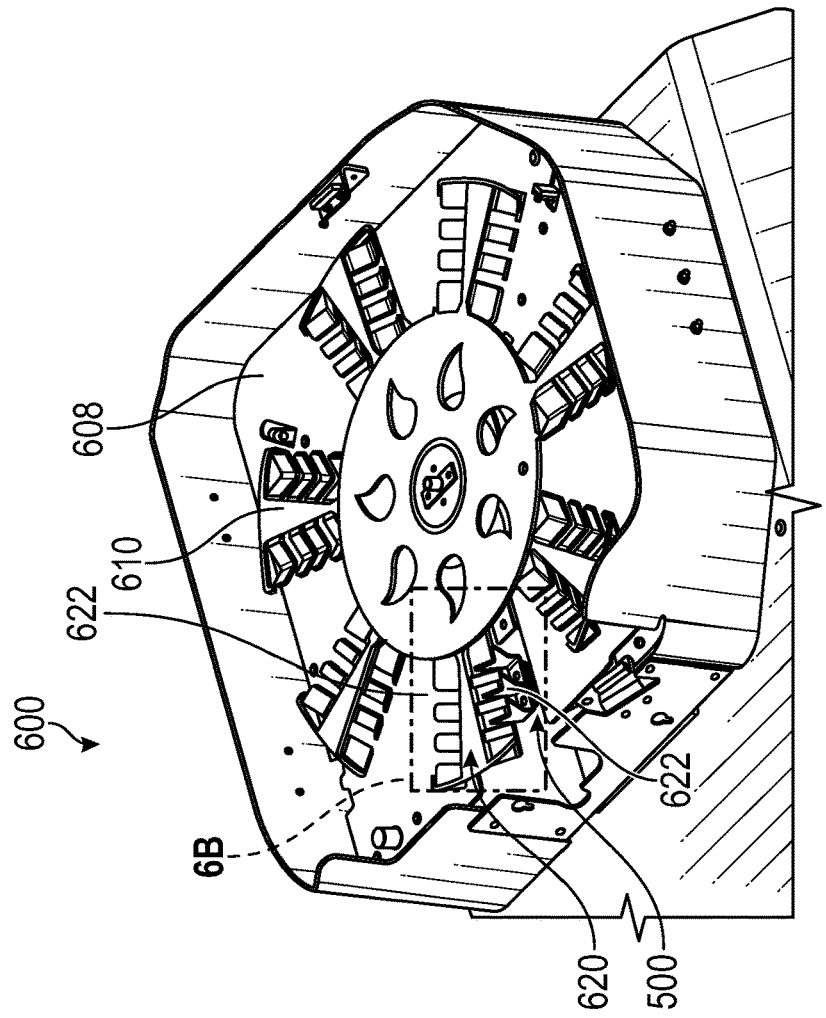

FIGS. 6A and 6B depict another example of an autoloader 604. The autoloader 604 includes a carousel 610 that has multiple cradles 622 (14 in the illustrated embodiment). The carousel 610 is positioned above a deck 608 having an opening 620 through with a lifter 500 can move a vial carrier support 626. The cradles 622 extend from a central portion of the carousel in pairs (e.g., cradle 622 and cradle 630). Each cradle 622 includes multiple tines 624 (four tines 624a-d in the illustrated embodiment). The vial carrier support 626 is configured as a skeletal lifter that includes multiple projections 626 (three projections 626a-c in the illustrated embodiment). Each projection 626 is sized and positioned to extend through clearance slots between adjacent tines 624 of the cradle 622. For example, projection 626a is sized and positioned to extend between tine 624a and tine 624b.

In the embodiment illustrated in FIGS. 6A and 6B, each cradle 622 includes multiple tines with each tine shaped as a slotted vee that carries respective vials 112 without rolling. A vial 112 is removed from its cradle by a skeletal lifter, which can overlap the support for the vial, by moving through the clearance slots. This is visible in the detailed views in FIGS. 6A and 6B. The vial in location 4 can be lifted clear of the carousel 610, and the carousel rotated clockwise (CW) to an adjacent clear area, so it can be lowered to the carriage. Similarly, a vial in location 5 can be lifted clear of the carousel 610, and the carousel rotated counter-clockwise (CCW) to an adjacent clear area, so it can be lowered to the carriage assembly.

An alternative geometry in which vials are not rotated is shown in FIGS. 7A-E and 8. In this configuration, a carousel 706 has vee-shaped recesses, with a pusher 700 that extended so that a vial 112 is moved out of the carousel 706 to engage a vial carrier support 704 of a lifter. The illustrated vial carrier support 704 includes a stopper 708 that registers the vial 112 at a proper location on the vial carrier support 704. The carousel 706 may be formed out of sheet metal.

Figure 7A:
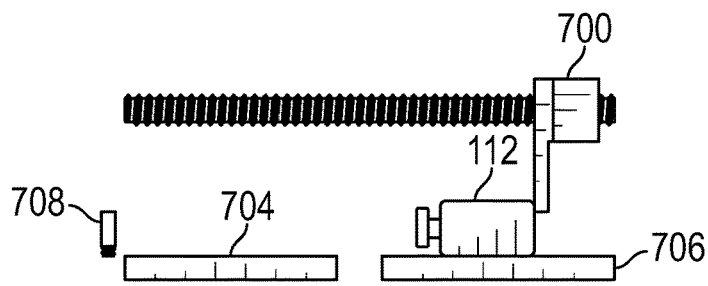
FIGS. 7A, 7B, 7C, 7D, and 7E are side views of a pushing mechanism at various positions for manipulating a vial in an alternate carousel.
Figure 7B:
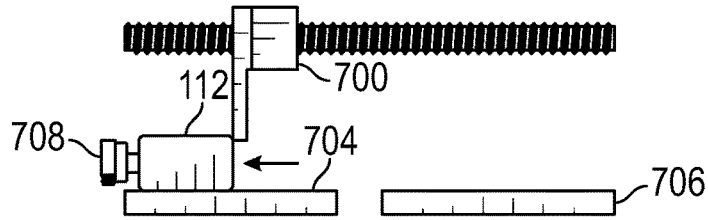
Figure 7C:
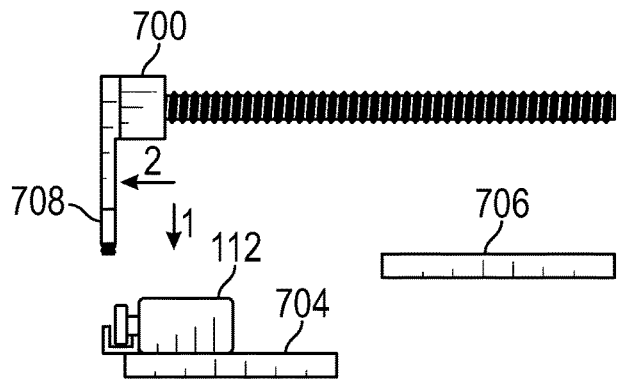
Figure 8:
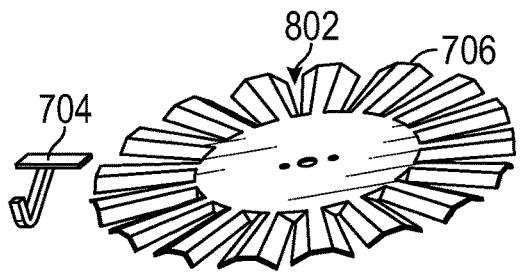
FIG. 8 is a perspective view of the alternative carousel for an autoloader having the pushing mechanism of FIGS. 7A-7E.
Figure 7D:
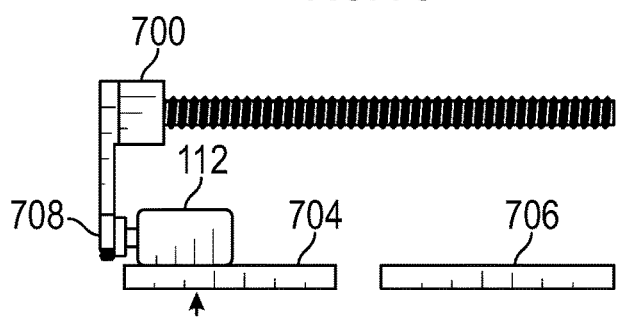
Figure 7E:
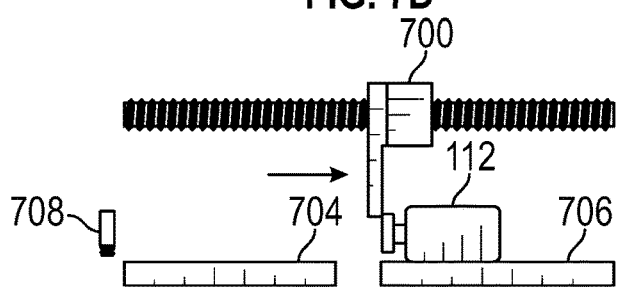

In FIGS. 7A-E a sequence of motions are shown for a carousel 706 that supports the vials 112 in vee-shaped recesses 802. In FIG. 7A, the pusher 700 moves a vial 112 on the carousel 706 radially toward the vial carrier support 704 of the lifter, which is aligned with the carousel position. In FIG. 7B, the pusher 700 continues to push the vial 112 onto the vial carrier support 704 until it reaches a stopper 708, which registers the vial 112 on the vial carrier support 704. In FIG. 7C, the lifter lowers the vial below the carousel on the vial carrier support 704 into a carriage assembly of the analyzer 102 for analysis and the pusher is moved to the opposite side of the vial. After analysis, in FIG. 7D, the lifter raises the vial on the vial carrier support 704 out of the carriage assembly of the analyzer 102 and back to the level of the carousel 706. In FIG. 7E, the pusher 700 (now on the opposite side of the vial) moves the vial 112 radially from the vial carrier support 704 back onto the carousel 706.

Figure 9:
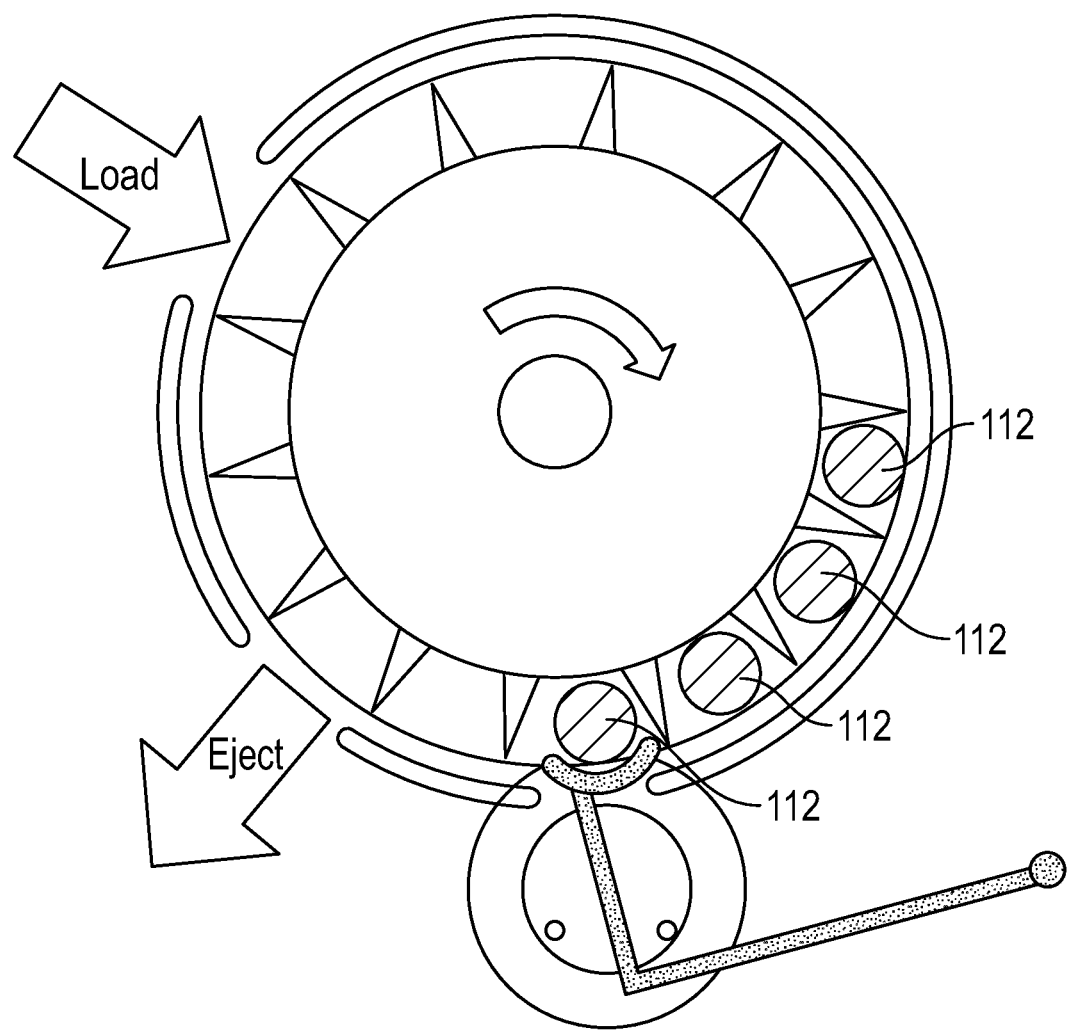
FIG. 9 is an illustration of an alternative autoloader implementation.

FIG. 9 depicts a "Ferris wheel" in which vials 112 are rotated about a horizontal axis. The outer guiding features are fixed, and an inner wheel with vanes or slots drives the vials clockwise. The footprint of the overall system is reduced. The illustrated design is loaded from the side, orienting the carriage of the analyzer to operate front-to-back to enable an autosampler to be loaded from the front. The analyzer may be positioned at the bottom of the wheel (e.g., at 6-o'clock). This design can be inverted, with the moving part shifted to the periphery with vanes or slots that extend to the axis. In this case, the inner guiding portion would be fixed, with provisions for the lifter and ejection. The lifter could then be located at the top of the wheel (e.g, 12 o'clock).

Figure 10:
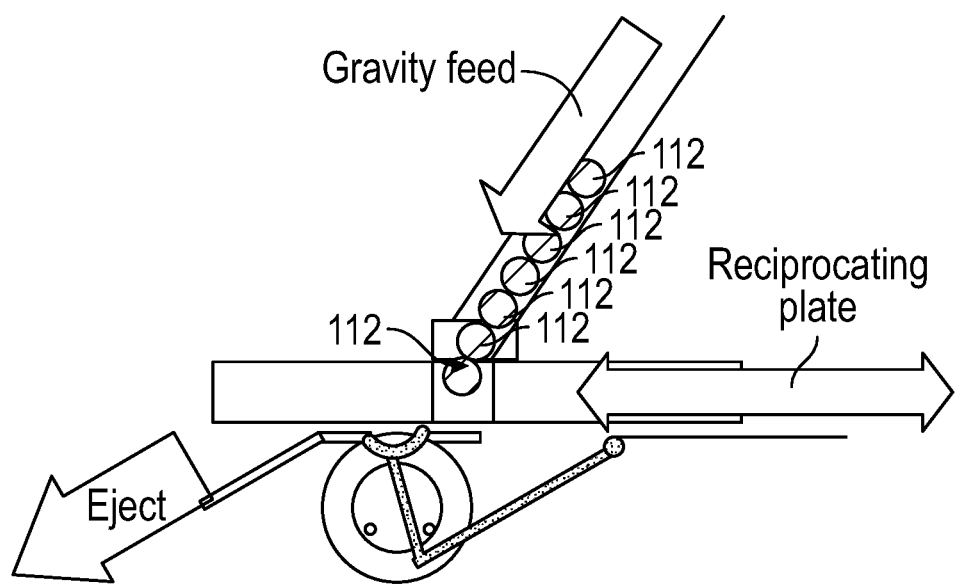
FIG. 10 is a side view of an alternative autoloader.

FIG. 10 shows an alternate means of retaining vials in a diagonal tray or magazine. The vials are fed by gravity into an indexer, which separates the vials and delivers vials individually in the order in which they were loaded. This is a one-way system, vials are released from the system for disposal. In other words, there is no recirculation. A reciprocating plate feeds a single vial, controlling the delivery of vials to the lifter. The feed plate reciprocates to move the vial to the lifer, and then to release the vials after testing.

Figure 11B:
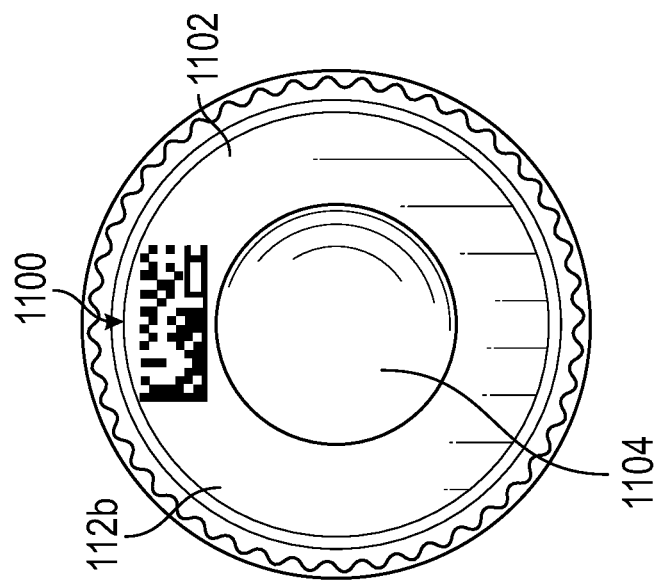
FIGS. 11A and 11B are perspective and top views, respectively, of a cap for a vial.
Figure 11A:
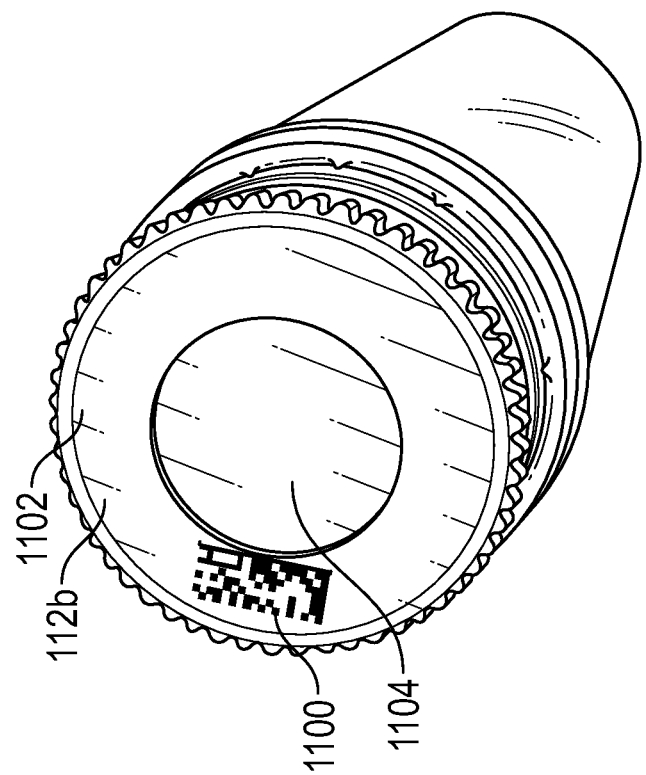

FIGS. 11A and 11B illustrate the use of a barcode 1100 (e.g., an 8-digit barcode) to recognize and confirm that the correct samples are loaded. The barcode 1100 may be positioned on the top face 1102 of the cap 112b. The barcode can be laser-etched into the cap 112b. This allows a simple barcode reader to be used. The operator can re-use caps; with the encoded number used to track a specific sample and correlated to actual sample information. The illustrated cap 112b includes a septum 1204 that is pierced by a needle (not shown) of the analyzer 102 during analysis of the sample within the vial 112.

Among other features, the present disclosure describes:
A vertical axis carousel that supports a set of vials for delivery to an analyzer that includes examples allowing vials to rotate. Other examples inhibit rolling where it is not desirable.
A vertical lifter mechanism that delivers vials to an analyzer, along with fixed camming surfaces that ensure proper axial alignment of the sample vials and engagement with the analyzer.
A loading slot position is defined, with a sensor to detect when a vial with metal cap has been loaded in a specific position and is oriented correctly.
A pre-test purging algorithm is provided for samples that are sensitive to dwell time in an autosampler.
A cover is provided with an interlock, to determine when it is opened. Opening the cover during testing indicates that samples could be disturbed and initiates an integrity check.
A horizontal axis carousel positioned over the analyzer, enabling a smaller footprint.

Figures 12, 13:
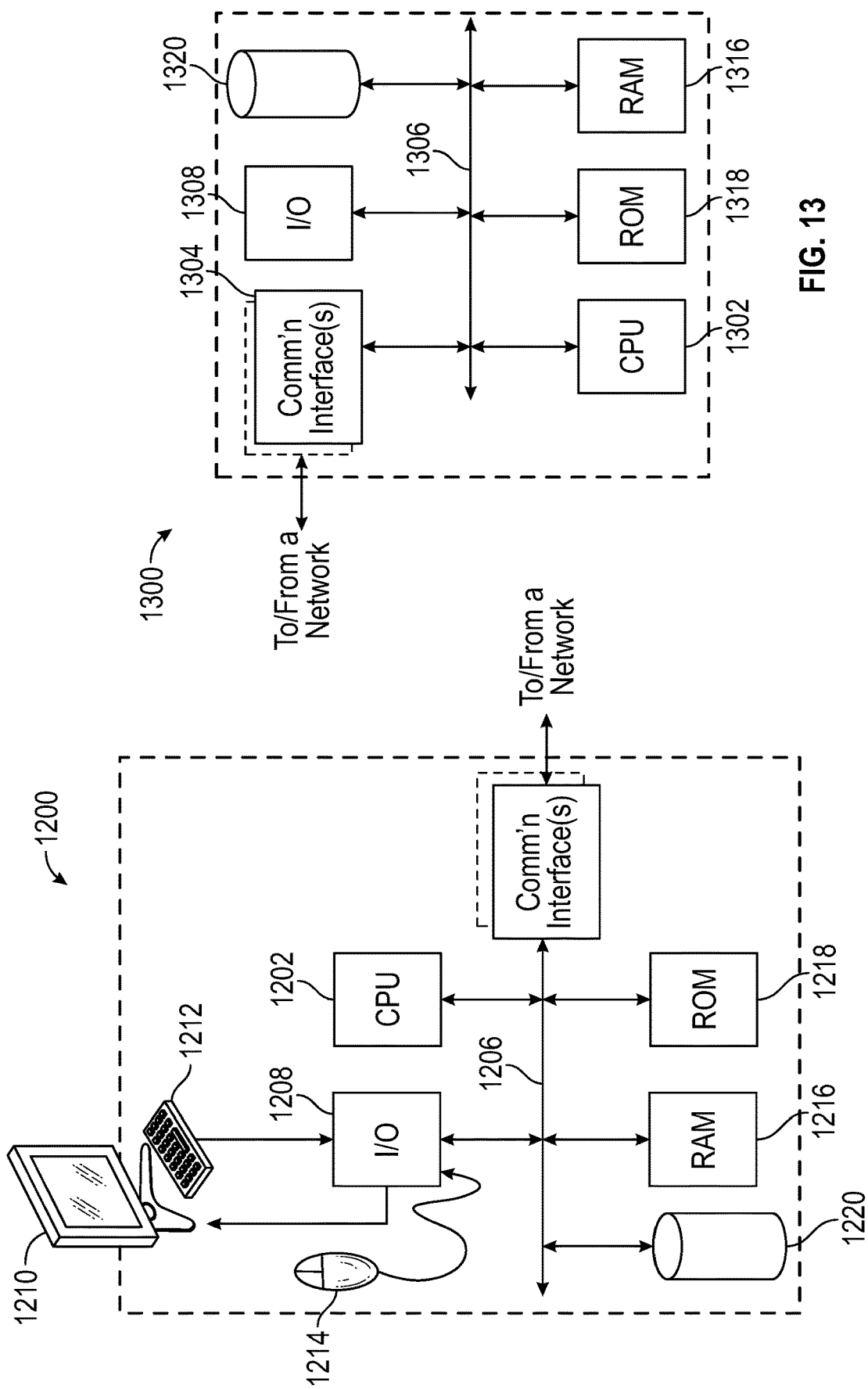
FIG. 12 is a functional block diagram illustrating a general-purpose computer hardware platform configured to implement the functional examples described with respect to FIGS. 1-11.
FIG. 13 is another functional block diagram illustrating a general purpose computer hardware platforms configured to implement the functional examples described with respect to FIGS. 1-11.

FIGS. 12 and 13 are functional block diagrams illustrating general-purpose computer hardware platforms configured to implement the functional examples described with respect to FIGS. 1-11 as discussed above.

Specifically, FIG. 12 illustrates an example network or host computer platform 1200, as may be used to implement for implementing a server. Specifically, FIG. 13 depicts an example computer 1300 with user interface elements, as may be used to implement a personal computer or other type of workstation or terminal device, although the computer 1300 of FIG. 13 may also act as a server if appropriately programmed. It is believed that those skilled in the art are familiar with the structure, programming, and general operation of such computer equipment and as a result the drawings should be self-explanatory.

Hardware of an example server computer (FIG. 12) includes a data communication interface for packet data communication. The server computer also includes a central processing unit (CPU) 1202, in the form of circuitry forming one or more processors, for executing program instructions. The server platform hardware typically includes an internal communication bus 1206, program and/or data storage 1216, 1218, and 1220 for various programs and data files to be processed and/or communicated by the server computer, although the server computer often receives programming and data via network communications. In one example, as shown in FIG. 12, the computer system includes a video display unit 1210, (e.g., a liquid crystal display (LCD) or a cathode ray tube (CRT)), an alphanumeric input device 1212 (e.g., a keyboard), a cursor control device 1214 (e.g., a mouse), each of which communicate via an input/output device (I/O) 1208. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface 1304, CPU 1302, main memory 1316 and 1318, one or more mass storage devices 1320 for storing user data and the various executable programs, an internal communication bus 1306, and an input/output device (I/O) 1308 (see FIG. 13).

Aspects of the methods for image projection mapping, as outlined above, may be embodied in programming in general purpose computer hardware platforms (such as described above with respect to FIGS. 12 and 13), e.g., in the form of software, firmware, or microcode executable by a networked computer system such as a server or gateway, and/or a programmable nodal device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Aspects of the methods for image projection mapping, as outlined above, may be embodied in programming in general purpose computer hardware platforms (such as described above with respect to FIGS. 12 and 13), e.g., in the form of software, firmware, or microcode executable by a networked computer system such as a server or gateway, and/or a programmable nodal device, program aspects of the technology may be thought of as "products" or "articles of manufacture" typically in the form of executable code and/or associated data that is carried on or embodied in a type of machine readable medium. "storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks, such communications, for example, may enable loading of the software, from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data, many of these forms of computer readable media may be involved in carrying one or more sequences of one or more instructions to a processor for execution.

Program instructions may include a software or firmware implementation encoded in any desired language, programming instructions, when embodied in machine readable medium accessible to a processor of a computer system or device, render computer system or device into a special-purpose machine that is customized to perform the operations specified in the program performed by electronics of the analyzer 102 or the autoloader 104.

Figure 14:
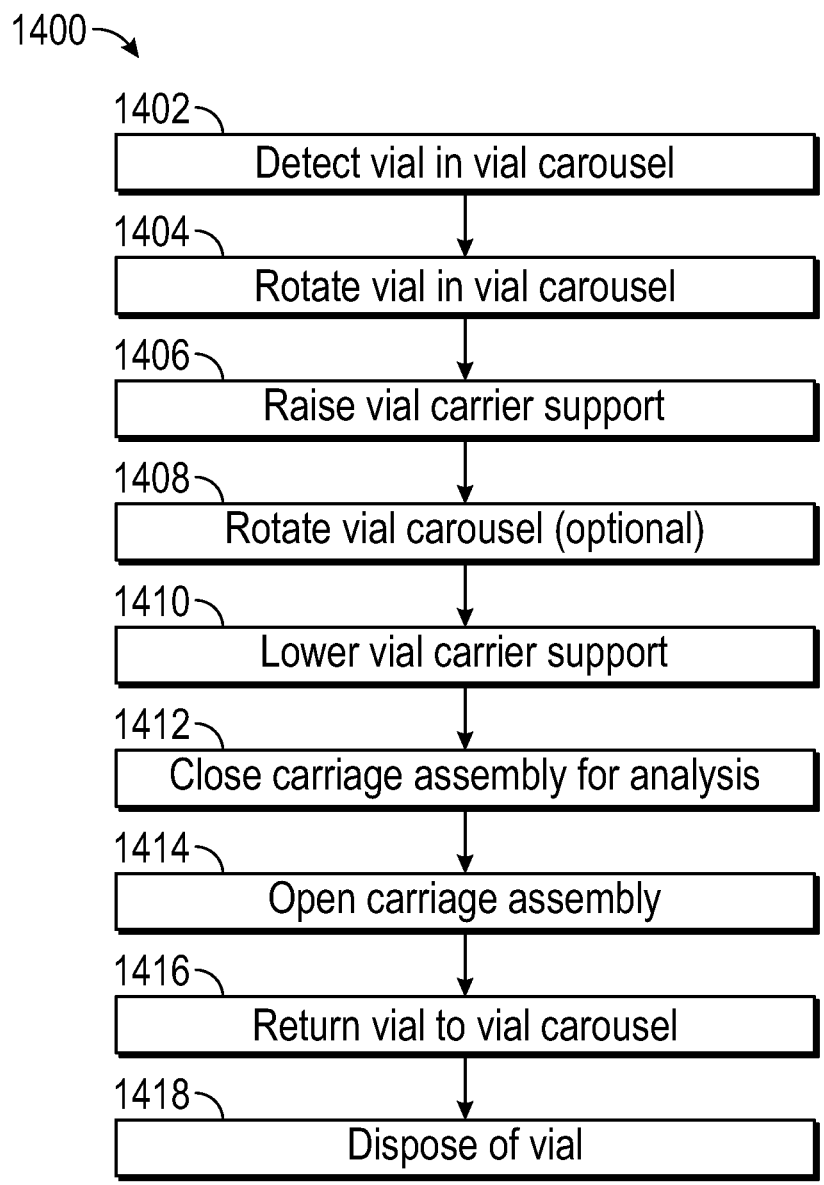
FIG. 14 is a flow chart of example steps for loading vials into an autoloader.

FIG. 14 depicts a flow chart 1400 of example methods for sequentially loading vials into an analyzer, where the analyzer having a carriage assembly configured to load and unload each of the vials into the analyzer in a horizontal orientation. Although the steps are described with reference to the analyzer 102 and the autoloader 104 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

At block 1402, the autoloader detects a vial within the autoloader. In an example, electronics 402 detect a vial positioned within an opening of the carousel 110 by sensing a cap of the vial (e.g., with a sensor such as a Hall effect sensor). The electronics 402 may detect the vial above the sensor and store its location in memory when it is positioned within that opening.

At block 1404, the autoloader rotates the vial carousel with respect to a lifter having a vial carrier support to align a first transport station of the vial carousel with a loading location of a vial carrier support. In one example, the electronics 402 of the autoloader 104 rotate the vial carousel 110 with respect to the lifter 500 to align a first transport station of the vial carousel with a loading location 120 of a vial carrier support. In another example, electronics of the autoloader 604 rotates the carousel 610 with respect to the lifter 500 to align a first transport station with a vial carrier support.

At block 1406, the autoloader raises the vial carrier support to a raised position to engage a first vial in a first transport station of the vial carousel. In one example, the electronics 402 raise the vial carrier support to the raised position prior to rotating the vial carousel 110 to align the first transport station of the vial carousel with the loading location. This results in the vial carrier support supporting the lower surface of the vial 112 when the vial carousel 110 rotates to align the first transport station of the vial carousel with the loading location.

In another example, where vial carousel includes cradles that fully support the vials, the electronics 402 raise the vial carrier support to the raised position after rotating the vial carousel 110 to align the first transport station of the vial carousel with the loading location. This results in the vial carrier support lifting the vial 112 out of the cradle supporting the vial 112.

At block 1408, the autoloader optionally rotates the vial carousel while the vial carrier support is in a raised position to remove the plurality of tines from the loading location for the vial carrier support. In examples where the vial carousel includes cradles that fully support the vials, the vial carousel is rotated to move the vial cradle out of the way to enable the vial carrier support to be lowered without interference from the cradles. For a vial carousel 610 such as illustrated in FIG. 6B, when a vial 112 is positioned in the vial cradle 622, the electronics 402 will rotate the vial carousel a few degrees clockwise to remove the cradle 622 from the path of the vial carrier support when it is being lowered. For an adjacent cradle 630, the electronics 402 will rotate the vial carousel a few degrees counterclockwise to remove the cradle 622 from the path of the vial carrier support when it is being lowered At block 1410, the autoloader lowers the vial carrier support from the raised position to the lowered position. In examples where the autoloader rotates the vial carousel (block 1408), the autoloader lowers the vial carrier support after the cradle is moved out of the way. As the vial carrier support is lowered, it passes through the carriage assembly, which engages the vial and disengages the vial from the vial carrier support. In an example, the lift lowers the vial at an angle toward the analyzer At block 1412, the carriage assembly closes and the analyzer analyzes the sample within the vial. At block 1414, the carriage assembly opens. After the carriage assembly opens, at block 1416, the vial carrier support is raised to return the vial back to the vial carousel. In examples where the vial carousel includes cradles that fully support the vials, the vial carousel is rotated to move the vial cradle under the vial after the vial carrier support is fully raised. The vial carrier support is then lowered to return the vial to the cradle.

At block 1418, the vial is disposed of. In an example, the vial 112 is disposed of by rotating the carousel 110 to move the vial 112 to a vial disposal station 124 and opening a trap door 440 below the vial 112 in the vial disposal station. A collection container (not shown) may be positioned adjacent the trap door to collect the vial after is falls through the opening created by opening the trap door 440.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is ordinary in the art to which they pertain (e.g., plus or minus 10 percent or 10 degrees). For example, orientation terms such as horizontal and vertical are intended to encompass a range of directions, e.g., plus or minus 10 degrees, surrounding the horizontal and the vertical orientations, respectively.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of sections 101, 102, or 105 of the patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein, relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim, rather, as the following claims reflect, inventive subject matter lies in less than all features of a single disclosed embodiment. Thus, the following claims are hereby incorporated into the Detailed Description, with each claim standing on its own as a separately claimed subject matter.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim, rather, as the following claims reflect, the subject matter to be protected lies in less than all features of any single disclosed example. Thus, the following claims are hereby incorporated into the Detailed Description, with each claim standing on its own as a separately claimed subject matter.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A device for sequentially loading vials into an analyzer, the analyzer having a carriage assembly configured to load and unload each of the vials into the analyzer in a horizontal orientation, the device comprising:
   a lifter having a vial carrier support, the lifter configured to move the vial carrier support between a raised position and a lowered position, wherein, when the device is connected to the analyzer, the raised position is above the carriage assembly and the lowered position is below the carriage assembly;
   a deck having a lower surface and an upper surface, the deck having an opening extending from the lower surface to the upper surface, the opening positioned and sized to accommodate the vial carrier support of the lifter when moving between the lowered position and the raised position;
   a vial carousel above the deck having a plurality of vial transport stations, each vial transport station configured to receive a vial in a horizontal orientation and arranged to transport the received vial to a loading location for the vial carrier support as the vial carousel rotates,
   wherein the upper surface of the deck is a planar surface adjacent the vial carousel, the vial carrier support is adjacent the upper surface of the deck when in the raised position, and each vial transport station in the vial carousel is a rectangular opening extending through the vial carousel; and
   a controller coupled to the lifter and the vial carousel, the controller configured to:
      rotate the vial carousel to align a first transport station with the loading location for the vial carrier support;
      raise the vial carrier support to the raised position to engage a first vial in the first transport station; and
      lower the vial carrier support from the raised position to the lowered position, wherein, when the device is connected to the analyzer, the carriage assembly engages the first vial and disengages the first vial from the vial carrier support for loading into the analyzer.

2. The device of claim 1, wherein the lifter is configured to lower the vial carrier support at an angle toward the analyzer.

3. The device of claim 2, further comprising:
   an angled retainer coupled to the carriage assembly, the angled retainer configured to engage a cap of the first vial as the vial carrier support is lowered and to register the first vial horizontally within the carriage assembly.

4. The device of claim 1, wherein the vial carrier support supports the first vial in the first vial transport station when aligned with the loading location for the vial carrier support, and the deck supports the other vials in the other vial transport stations when the first vial transport station is aligned with the loading location for the vial carrier support.

5. The device of claim 4, wherein the rectangular openings push the vials and the vials roll on the deck within the rectangular openings as the carousel rotates.

6. The device of claim 5, wherein each of the rectangular openings has at least one side angled inward toward a center of the rectangular opening from a bottom side of the carousel to a top side of the carousel to reposition the first vial on the vial carrier support as the vial carrier support is raised to register the first vial within one of the vial transport stations.

7. The device of claim 1, wherein each of the vial transport stations comprises a cradle configured to fully support a respective one of the vials and wherein each cradle comprises a plurality of tines supported by the carousel and corresponding spaces between adjacent tines of the plurality of tines.

8. The device of claim 7, wherein the vial carrier support comprises a plurality of projections configured to pass through the corresponding spaces of the plurality of tines and to engage the respective vial in the vial transport station at the loading location for the vial carrier support.

9. The device of claim 8, wherein when raising the vial carrier support to the raised position, the vial carrier support lifts the respective vial out of the cradle and wherein the controller is further configured to:
    rotate the vial carousel while the vial carrier support is in the raised position to remove the plurality of tines from the loading location for the vial carrier support; and
    wherein the vial carrier support is lowered with the plurality of tines removed from the loading location.

\* \* \* \* \*